(12) United States Patent
Yang et al.

(10) Patent No.: US 8,789,957 B2
(45) Date of Patent: Jul. 29, 2014

(54) LIGHT SOURCE MODULE AND PROJECTION APPARATUS

(75) Inventors: Tzu-Yi Yang, Hsin-Chu (TW); Sheng-Chieh Tai, Hsin-Chu (TW); Ko-Shun Chen, Hsin-Chu (TW); Chia-Hao Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 291 days.

(21) Appl. No.: 13/278,181

(22) Filed: Oct. 21, 2011

(65) Prior Publication Data

US 2012/0206900 A1 Aug. 16, 2012

(30) Foreign Application Priority Data

Feb. 11, 2011 (CN) .......................... 2011 1 0038247

(51) Int. Cl.
*F21V 9/16* (2006.01)

(52) U.S. Cl.
USPC ......................... 362/84; 362/296.01; 353/84

(58) Field of Classification Search
CPC . F21Y 2101/02; F21Y 2101/025; F21V 7/08; F21V 7/09; F21W 2131/406; F21K 9/00; H04N 9/3114; G03B 21/28
USPC ............ 362/84, 296.01, 311.01, 296.06, 227, 362/231, 232, 233, 235, 293, 311.12; 353/84, 98, 20, 37, 31, 34, 99; 348/339, 742, 743; 359/634; 349/5, 7
See application file for complete search history.

(56) References Cited

U.S. PATENT DOCUMENTS

| 7,232,228 | B2 | 6/2007 | Li | |
|---|---|---|---|---|
| 7,618,158 | B2 | 11/2009 | Li | |
| 2006/0274285 | A1* | 12/2006 | Pao | ................................ 353/84 |
| 2007/0019408 | A1* | 1/2007 | McGuire et al. | .............. 362/231 |
| 2008/0030993 | A1 | 2/2008 | Narendran et al. | |
| 2011/0176305 | A1* | 7/2011 | Schallmoser | ................ 362/235 |
| 2011/0249436 | A1* | 10/2011 | Li et al. | .................... 362/235 |
| 2013/0100644 | A1* | 4/2013 | Hu et al. | ......................... 362/84 |
| 2013/0155648 | A1* | 6/2013 | Morgenbrod et al. | .......... 362/84 |
| 2013/0229634 | A1* | 9/2013 | Hu et al. | ........................ 353/84 |
| 2013/0271954 | A1* | 10/2013 | Li et al. | ........................... 362/84 |

FOREIGN PATENT DOCUMENTS

WO     WO 2011118345 A1 *  9/2011

* cited by examiner

*Primary Examiner* — Nimeshkumar Patel
*Assistant Examiner* — Glenn Zimmerman
(74) *Attorney, Agent, or Firm* — Jianq Chyun IP Office

(57) ABSTRACT

A light source module includes a light-emitting device emitting an excitation light beam, a reflective component including a reflective surface with a first focal point and a second focal point, a wavelength conversion device including a plurality of excited regions and disposed nearby the first focal point and on the transmission path of the excitation light beam, and an optical component. By rotating the wavelength conversion device, the excitation light beam irradiates the different excited regions at different time, so that the excitation light beam is converted into different wavelength light beams at different time, and the different wavelength light beams respectively correspond to the excited regions and are reflected by the reflective surface and converged at the second focal point. The optical component is disposed nearby the second focal point so the different wavelength light beams pass through the second focal point and are transmitted to the optical component.

24 Claims, 5 Drawing Sheets

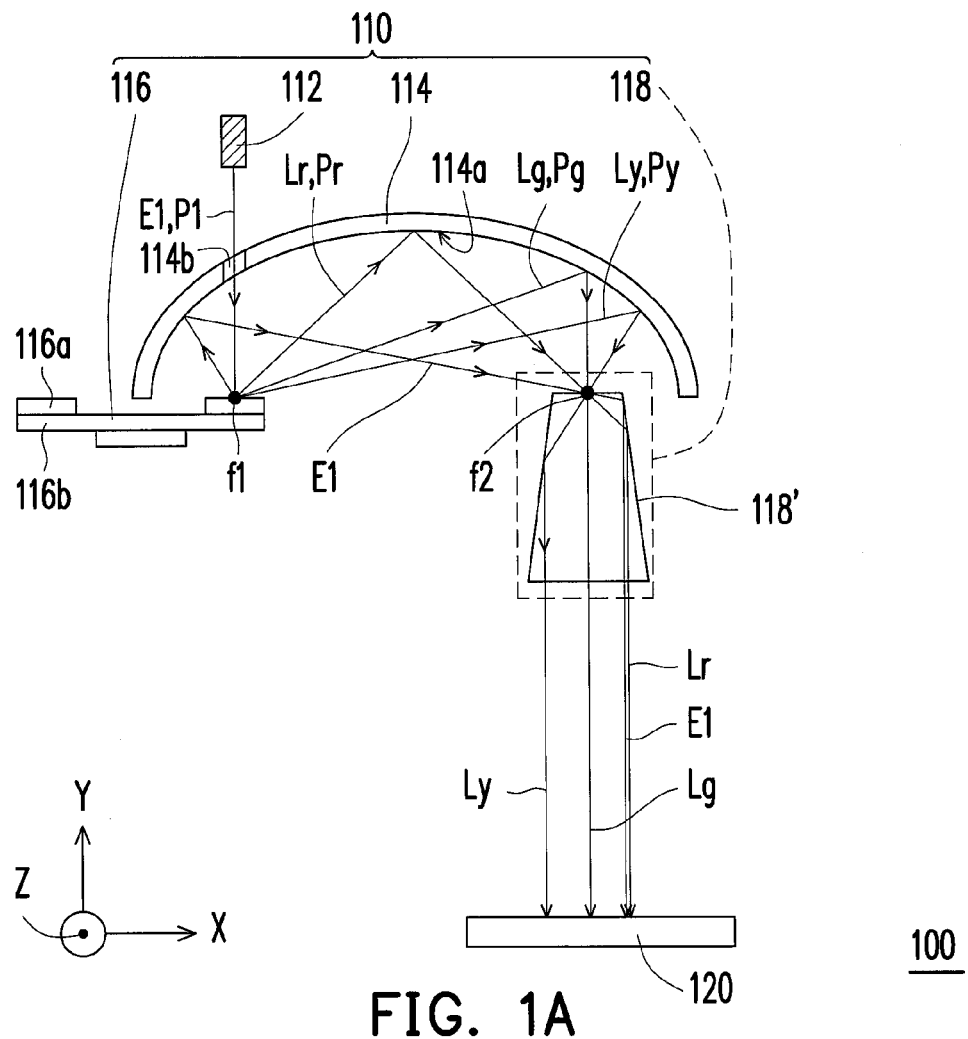
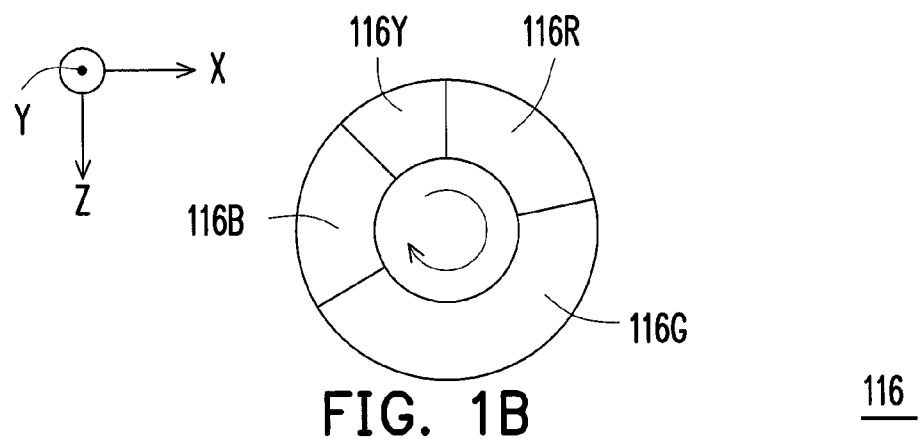
FIG. 1A
FIG. 1B

LIGHT SOURCE MODULE AND PROJECTION APPARATUS

CROSS-REFERENCE TO RELATED APPLICATION

This application claims the priority benefit of China application serial no. 201110038247.9, filed on Feb. 11, 2011. The entirety of the above-mentioned patent application is hereby incorporated by reference herein and made a part of this specification.

BACKGROUND OF THE INVENTION

1. Field of the Invention

The invention relates to a light source module and a projection apparatus, and more particularly, to a light source module with high brightness and a projection apparatus having the light source module.

2. Description of Related Art

Along with the progress of display technology, a projection apparatus can adopt different light sources, in which in addition to adopting an ultra high pressure lamp (UHP lamp) emitting white light in association with a color wheel to sequentially produce red light, green light and blue light, such that the projection apparatus is able to provide colorful image frames. Recently, red light emitting diode (LED), green LED and blue LED are also used to serve as a light source for a projection apparatus.

In a projection apparatus with LEDs as a light source, the light beams emitted from red, green and blue LEDs would be combined through a combining-light system, so that the different color light beams along different transmission directions are guided to a same direction. The luminance of a projector bases on the construction depending on the brightness of the LEDs. Especially, the green LED plays a role as a major light source of the LEDs for contributing the brightness of the construction, so that the total luminance of the projector is limited by the light-emitting efficiency of the green LED. However, the light-emitting efficiency of the green LED currently is not high and unlikely good as the light source of a projector with high luminance (for example, greater than 2000 ANSI lumens). In this regard, some projectors use a hybrid light source so as to increase the luminance of the projector.

For example, the hybrid light source is designed by using a blue laser light to excite the green phosphor powder on a color wheel, so that the blue laser light is converted into a green light. At the time, the combining-light system is used to combine the green light with the blue and red lights respectively emitted from a blue LED and a red LED so as to provide the projector with a required illumination light source. In addition, in the current technology, usually a lens is disposed before the color wheel to collect the green light after the above-mentioned conversion so as to increase the light-converging efficiency for the green light. However, to avoid the color wheel and the lens from being interfered with each other, a specific distance between the color wheel and the lens must remain, which limits the light-converging efficiency of the lens. On the other hand, to meet the design requirement of the hybrid light source, the combining-light system requires an additional dichroic mirror to change the optical transmission path of the longer wavelength light, followed by combining the longer wavelength light with other color light. As a result, more optical components are employed here and the light loss would be relatively more after passing through the optical components.

Several patents relating to illumination models are provided. For example, U.S. Pat. Nos. 7,618,158 and 7,232,228 disclose an illumination system, wherein a light source is disposed at a first focal point of a reflector so that the light beam emitted from the light source is converged at a second focal point. Additionally, U.S. Patent Application No. 20080030993 discloses a scheme that an LED or a laser diode (LD) is disposed in a reflective cup to excite a wavelength conversion material so that a shorter wavelength light and a longer wavelength light are mixed by each other to produce a white light.

SUMMARY OF THE INVENTION

Accordingly, the invention is directed to a light source module capable of providing a light source with high luminance.

The invention is also directed to a projection apparatus including the above-mentioned light source module.

Additional aspects and advantages of the invention will be set forth in the description of the techniques disclosed in the invention.

To achieve one of, a part of or all of the above-mentioned objectives, or to achieve other objectives, an embodiment of the invention provides a light source module including a light-emitting device, a reflective component, a wavelength conversion device and an optical component. The light-emitting device emits an excitation light beam. The reflective component includes a reflective surface, in which the reflective surface has a first focal point and a second focal point. The wavelength conversion device includes a plurality of excited regions and is disposed nearby the first focal point and on the transmission path of the excitation light beam. By rotating the wavelength conversion device, the excitation light beam irradiates the different excited regions at different time, so that the excitation light beam is converted into different wavelength light beams at different time. The different wavelength light beams respectively correspond to the different excited regions and are reflected by the reflective surface and converged at the second focal point. The optical component is disposed nearby the second focal point and on the transmission paths of the different wavelength light beams so that the different wavelength light beams pass through the second focal point and are transmitted to the optical component.

In addition, an embodiment of the invention provides a projection apparatus, which includes the above-mentioned light source module and a light valve, in which the light valve is disposed on the transmission paths of the above-mentioned excitation light beam and the different wavelength light beams.

Based on the depiction above, the embodiments of the invention can achieve at least one of the following advantages or effects. In the embodiments of the invention, the wavelength conversion device and the optical component are respectively disposed nearby the first focal point and the second focal point of the reflective surface of the reflective component, so that the different wavelength light beams nearby the first focal point are converged at the second focal point and transmitted to the optical component. As a result, the light-converging efficiency of the different wavelength light beams is advanced, such that the light source module provides a high luminance.

Other objectives, features and advantages of the invention will be further understood from the further technological features disclosed by the embodiments of the invention wherein there are shown and described preferred embodi-

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1A is a schematic view of a projection apparatus according to a first embodiment of the invention.

FIG. 1B is a schematic top view showing the wavelength conversion device of FIG. 1A on the XZ plane.

DESCRIPTION OF THE EMBODIMENTS

Figure 2:
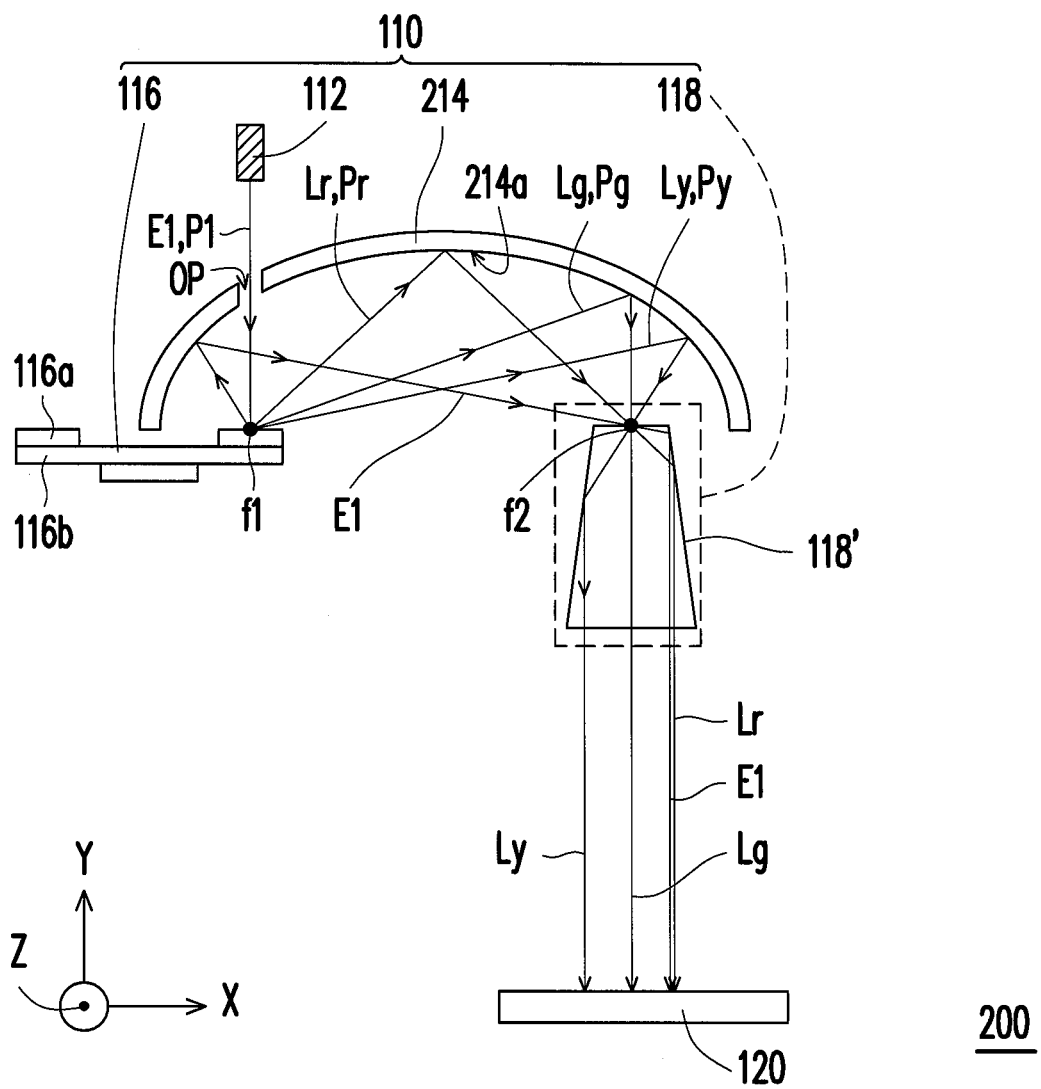
FIG. 2 is a schematic view of a projection apparatus according to a second embodiment of the invention.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The First Embodiment

FIG. 1A is a schematic diagram of a projection apparatus according to the first embodiment of the invention, and FIG. 1B is a schematic top view diagram showing the wavelength conversion device of FIG. 1A on the XZ plane. Referring to FIG. 1A, a projection apparatus 100 of the embodiment includes a light source module 110 and a light valve 120. The light source module 110 includes a light-emitting device 112, a reflective component 114, a wavelength conversion device 116 and an optical component 118. The light-emitting device 112 emits an excitation light beam E1. In the embodiment, the light-emitting device 112 is, for example, a blue solid-state laser, an UV laser or a blue light emitting diode, and the wavelength of the excitation light beam E1 falls in a range of, for example, greater than or equal to 380 nm but less than or equal to 460 nm. The reflective component 114 includes a reflective surface 114a, in which the reflective surface 114a has a first focal point f1 and a second focal point f2.

Referring to FIGS. 1A and 1B, the wavelength conversion device 116 includes a plurality of excited regions 116R, 116G and 116Y (three regions are described merely). The wavelength conversion device 116 is disposed nearby the first focal point f1 and on a transmission path P1 of the excitation light beam E1 so that the excitation light beam E1 after passing through the first focal point f1 is able to irradiate the wavelength conversion device 116. By rotating the wavelength conversion device 116, the excitation light beam E1 irradiates the different excited regions 116R, 116G and 116Y at different time, so that the excitation light beam E1 is correspondingly converted into different wavelength light beams. The different wavelength light beams can be light beams with different colors, for example, in the embodiment, the different wavelength light beams are three excited color light beams Lr, Lg and Ly. The three excited color light beams Lr, Lg and Ly respectively correspond to the excited regions 116R, 116G and 116Y and are capable of being reflected by the reflective surface 114a and converged at the second focal point f2. In the embodiment, the reflective surface 114a consists of a portion of an ellipse surface or two curve surfaces with different curvatures, i.e., the curved surfaces respectively corresponding to the first focal point f1 and the second focal point f2 can be incompletely symmetric with each other. In other words, the shape of the reflective surface 114a which is able to make the light beams converging from the first focal point f1 to the second focal point f2 is in the claim scope of the invention.

As shown by FIGS. 1A and 1B, the wavelength conversion device 116 of the embodiment includes a phosphor layer 116a and a reflective mirror 116b. The phosphor layer 116a is disposed on the reflective mirror 116b and is formed by coating phosphor powder onto the reflective mirror 116b. When the excitation light beam E1 alternately irradiates the different excited regions 116R, 116G and 116Y of the phosphor layer 116a, the particles of the phosphor powder (not shown) in the phosphor layer 116a would be excited and emit the three color light beams Lr, Lg and Ly. In more details, the excited regions 116R, 116G and 116Y can be respectively coated with, for example, red phosphor powder, green phosphor powder and yellow phosphor powder. Therefore, when the excitation light beam E1 irradiates the excited regions 116R, 116G and 116Y at different time, the red, green and yellow color light beams Lr, Lg and Ly are correspondingly emitted, wherein the red light beam Lr has the center wavelength falling in a range of greater than or equal to 605 nm but less than or equal to 670 nm, and the green light beam Lg has the center wavelength falling in a range of greater than or equal to 520 nm but less than or equal to 540 nm. In addition, the full-width half-maximum (FWHM) of both the red light beam Lr and the green light beam Lg is less than 120 nm. It should be noted that in other embodiments, the excited regions 116R, 116G and 116Y can be coated with other phosphor powders for producing other color light beams, and the invention is not limited thereto. In other embodiments, the number of the excited regions can be two or other numbers.

Continuously referring to FIG. 1A, the optical component 118 is disposed nearby the second focal point f2 and on the transmission paths Pr, Pg and Py of the three color light beams Lr, Lg and Ly, so that the three color light beams Lr, Lg and Ly after passing through the second focal point f2 are transmitted into the optical component 118. In the embodiment, the optical component 118 is a light-uniforming device, and the light-uniforming device is a light integration rod 118', in which the shape of the light integration rod 118' in the embodiment is in taper, so that the three color light beams Lr, Lg and Ly can emit from the light integration rod 118' with smaller exiting light angles. Specifically, the width of the light integration rod 118' is gradually wider along with a direction from the second focal point f2 to the light valve 120. However in other embodiments, the light integration rod 118' can be in other shapes, and the invention is not limited thereto.

The reflective component 114 of the embodiment includes a dichroic portion 114b, in which the dichroic portion 114b may be a dichroic film. The dichroic portion 114b is located between the light-emitting device 112 and the wavelength conversion device 116. The excitation light beam E1 passes through the dichroic portion 114b and is transmitted to the wavelength conversion device 116, and the dichroic portion 114b can reflect the three color light beams Lr, Lg and Ly. On the other hand, as shown by FIG. 1B, the wavelength conversion device 116 of the embodiment further includes a reflective region 116B to reflect the excitation light beam E1 from the focal point f1 to the second focal point f2 and the excitation light beam E1 then is transmitted to the optical component 118. In more details, when the excitation light beam E1 passes through the dichroic portion 114b and irradiates the reflective region 116B, the excitation light beam E1 (for example, blue light beam) would be diffused to every portion of the reflective portion 114a and then is reflected and converged at the second focal point f2, followed by entering the optical component 118. As shown by FIG. 1A, the light valve 120 of the embodiment is disposed on the transmission path of the excitation light beam E1 and the transmission paths Pr, Pg and Py of the three color light beams Lr, Lg and Ly after the optical component 118. In this way, the three color light beams Lr, Lg and Ly with different colors and the excitation light beam E1 are transmitted to the light valve 120 and are converted into colorful image frames (not shown) by the light valve 120. In the embodiment, the light valve 120 is, for example, a digital micro-mirror device (DMD), a liquid-crystal-on-silicon panel (LCOS panel) or a liquid-crystal panel (LC panel).

It can be seen that the projection apparatus 100 of the embodiment has no need to employ complex lenses to converge the three color light beams Lr, Lg and Ly and the excitation light beam E1; instead, the projection apparatus 100 employs a reflective component 114 to converge the above-mentioned light beams from the first focal point f1 to the second focal point f2 and the above-mentioned light beams are transmitted to the optical component 118. As a result, the projection apparatus 100 of the embodiment is advantageous in good light-converging efficiency, design simplicity and assembling/detaching convenience.

The Second Embodiment

As shown in FIG. 2, The projection apparatus 200 is similar to the projection apparatus 100 of FIG. 1A, while the main difference therebetween lies in that the reflective component 214 of the projection apparatus 200 further includes an opening OP. The opening OP is located between the light-emitting device 112 and the wavelength conversion device 116, so that the excitation light beam E1 passes through the opening OP and is transmitted to the wavelength conversion device 116. Then, when the excitation light beam E1 irradiates the reflective region 116B of the wavelength conversion device 116 (shown in FIG. 1B), the excitation light beam E1 is reflected from the first focal point f1 to the second focal point f2 and transmitted to the optical component 118. In this way, the three color light beams Lr, Lg and Ly and the excitation light beam E1 are transmitted to the light valve 120 and are converted into colorful image frames by the light valve 120.

The Third Embodiment

Figure 3A:
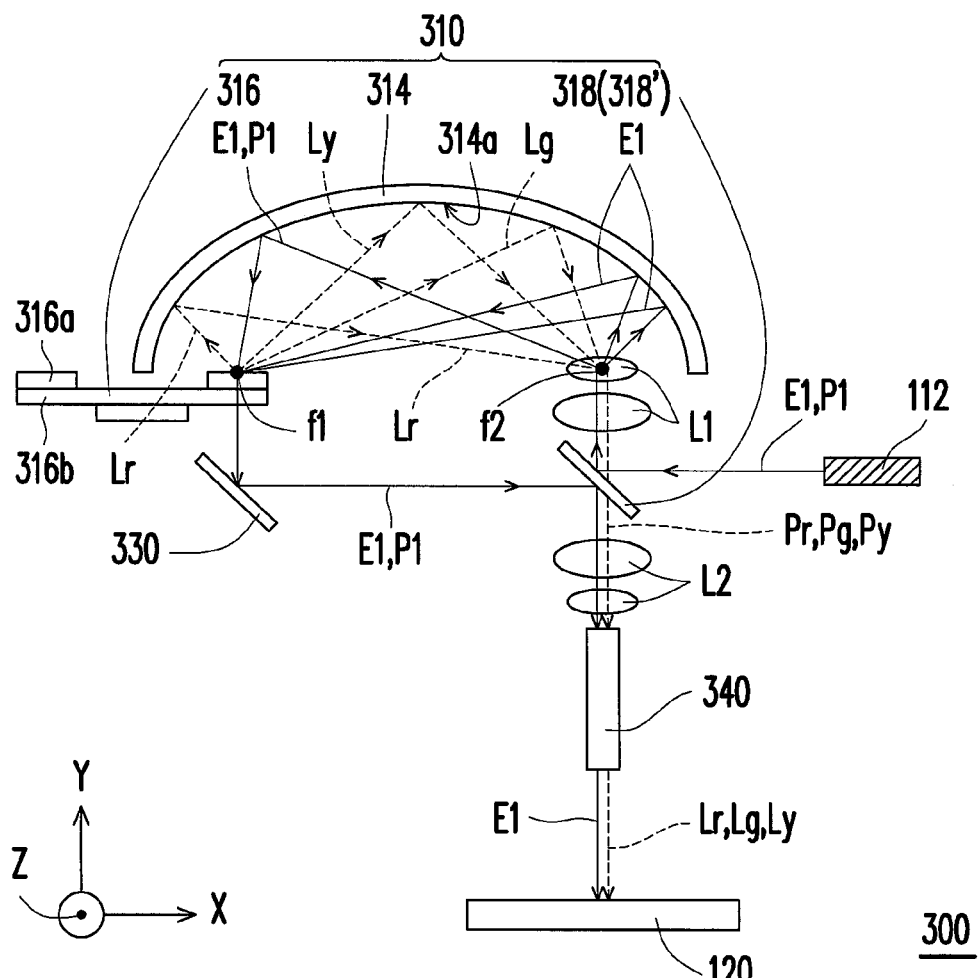
FIG. 3A is a schematic view of a projection apparatus according to a third embodiment of the invention.

Referring to FIG. 3A, the projection apparatus 300 of the embodiment includes a light source module 310 and a light valve 120. The light source module 310 includes the light-emitting device 112, a reflective component 314, a wavelength conversion device 316 and an optical component 318. The reflective component 314 has a reflective surface 314a. The projection apparatus 300 of the embodiment is similar to the projection apparatus 100 of FIG. 1A, while the main different therebetween lies in that the optical component 318 is a dichroic unit 318', in which the dichroic unit 318' is disposed between the light-emitting device 112 and the reflective component 314, nearby the second focal point f2 of the reflective surface 314a and on the transmission paths Pr, Pg and Py of the three color light beams Lr, Lg and Ly. The dichroic unit 318' is disposed between the second focal point f2 and the light valve 120. The dichroic unit 318' reflects the excitation light beam E1 and makes the three color light beams Lr, Lg and Ly pass through, in which the dichroic unit 318' is a dichroic mirror.

Figure 3B:
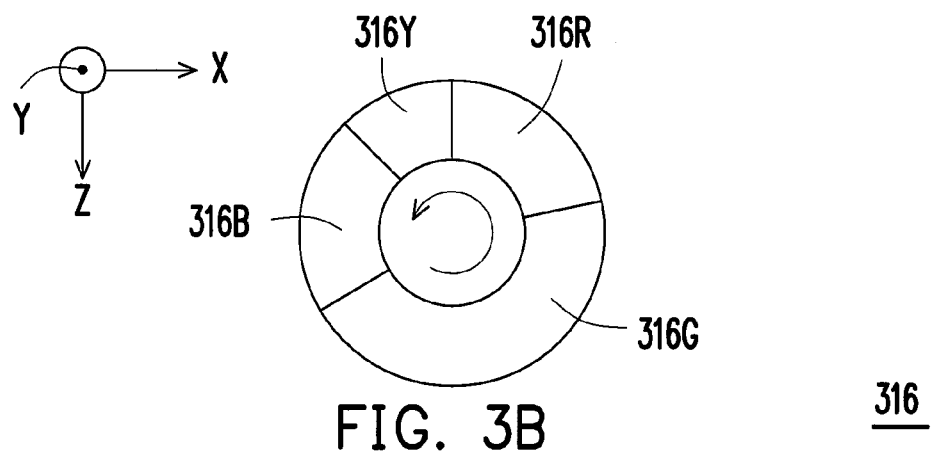
FIG. 3B is a top view showing the wavelength conversion device of FIG. 3A on the XZ plane.

In more details, as shown by FIGS. 3A and 3B, the wavelength conversion device 316 of the embodiment includes a plurality of excited regions 316R, 316G and 316Y (here only three regions are described). The wavelength conversion device 316 is disposed nearby the first focal point f1 and on the transmission path P1 of the excitation light beam E1. In addition, the wavelength conversion device 316 further includes a transparent region 316B, and the excitation light beam E1 passes through the transparent region 316B and then is transmitted to the optical component 318. In more details, the projection apparatus 300 of the embodiment includes an optical path deflection device 330, which is a reflective mirror. The optical path deflection device 330 is disposed between the wavelength conversion device 316 and the dichroic unit 318' to reflect the excitation light beam E1 passing through the transparent region 316B to the dichroic unit 318'. In other embodiments, a light-converging lens (not shown) can be disposed between the optical path deflection device 330 and the wavelength conversion device 316 so as to increase the light-converging efficiency of the excitation light beam E1 passing through the transparent region 316B, which the invention is not limited to.

As shown by FIG. 3A, the wavelength conversion device 316 of the embodiment includes a phosphor layer 316a and a reflective mirror 316b. The phosphor layer 316a is disposed on the reflective mirror 316b and includes phosphor powder (not shown) coated on the reflective mirror 316b. When the excitation light beam E1 alternately irradiates the different excited regions 316R, 316G and 316Y of the phosphor layer 316a, the particles of the phosphor powder in the phosphor layer 316a are excited and emit three color light beams Lr, Lg and Ly. In more details, in the embodiment, the excitation light beam E1 emitted from the light-emitting device 112 is reflected by the dichroic unit 318' to the second focal point f2 and then converged to the first focal point f1, and is further transmitted to the wavelength conversion device 316. By rotating the wavelength conversion device 316, the excitation light beam E1 irradiates the different excited regions 316R, 316G and 316Y at different time, so that the excitation light beam E1 is converted into the three color light beams Lr, Lg and Ly, in which the three color light beams Lr, Lg and Ly are respectively corresponding to the excited regions 316R, 316G and 316Y. Then, the three color light beams Lr, Lg and Ly located at the first focal point f1 are diffused in the reflective component 314 and reflected by the reflective surface 314a, and are converged again at the second focal point f2, which makes the three color light beams Lr, Lg and Ly pass through the dichroic unit 318' to be transmitted to the light valve 120. On the other hand, the excitation light beam E1 after passing through the transparent region 316B is reflected by the optical path deflection device 330 to the dichroic unit 318', where the excitation light beam E1 is reflected by the dichroic unit 318' to the light valve 120. In this way, the light valve 120 converts the three color light beams Lr, Lg and Ly and excitation light beam E1 into colourful image frames.

The projection apparatus 300 of the embodiment further includes at least one lens L1 (here only two are schematically shown). The lens L1 is disposed between the second focal point f2 and the dichroic unit 318'. The projection apparatus 300 includes at least one lens L2 (here only two are schematically shown). The lens L2 is disposed after the dichroic unit 318' and on the transmission paths Pr, Pg and Py of the color light beams Lr, Lg and Ly and on the transmission path P1 of the excitation light beam E1. The projection apparatus 300 further includes a light integration rod 340 disposed after the dichroic unit 318' and on the transmission paths Pr, Pg and Py of the three color light beams Lr, Lg and Ly. The lenses L1 and L2 and the light integration rod 340 can converge the exit light angles of the three color light beams Lr, Lg and Ly so that most of the three color light beams Lr, Lg and Ly can be transmitted to the light valve 120 to increase the light usage efficiency. It should be noted that in other embodiments, the projection apparatus 300 may not have the lenses L1 and L2 and light integration rod 340, which the invention is not limited to.

As shown by FIG. 3A, in the embodiment, the three color light beams Lr, Lg and Ly excited by the excitation light beam E1 are reflected by the reflective surface 314a and converged again at the second focal point f2, and then the three color light beams Lr, Lg and Ly are directed into the light integration rod 340 through the lenses L1 and L2. On the other hand, the excitation light beam E1 passing through the transparent region 316B is directed back to the light integration rod 340 through another optical path. Through the design of the reflective surface 314a, the to-and-fro paths of the excitation light beam E1 and the three color light beams Lr, Lg and Ly between the reflective component 314 and the wavelength conversion device 316 are via the first focal point f1 and the second focal point f2. As a result, the space between the reflective component 314 and the wavelength conversion device 316 can be largely reduced. Thereby, the light source module 310 of the embodiment is advantageous in design simplicity. In addition, when assembling the projection apparatus 300 of the embodiment, the assembling process is more insensitive to the tolerance, requires less labor hours and has reduced production cost.

The Fourth Embodiment

Figure 4:
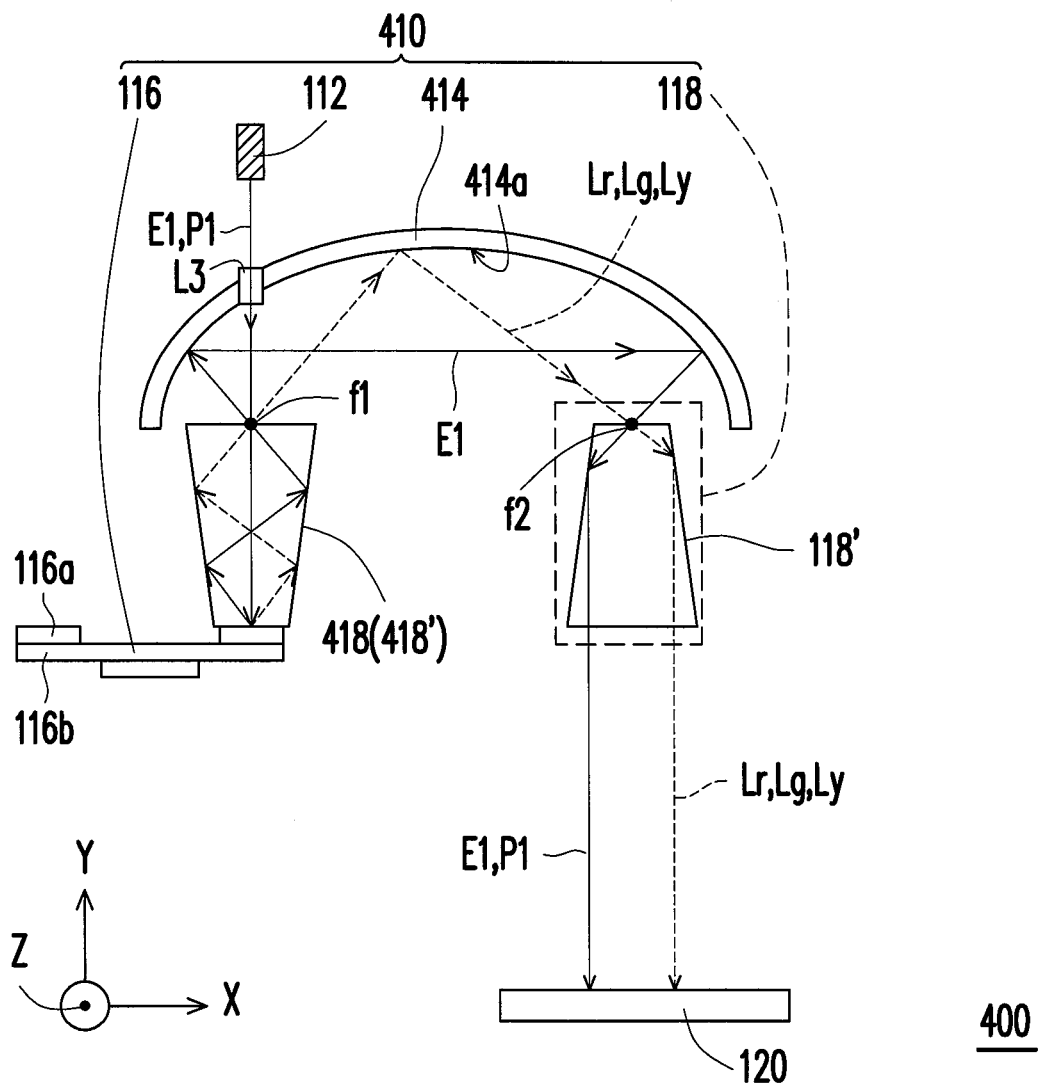
FIG. 4 is a schematic view of a projection apparatus according to a fourth embodiment of the invention.

Referring to FIG. 4, the projection apparatus 400 of the embodiment includes a light source module 410 and the light valve 120. The light source module 410 includes the light-emitting device 112, a reflective component 414, the wavelength conversion device 116 and the optical component 118, in which the wavelength conversion device 116 includes a plurality of excited regions (shown in FIG. 1B) and the wavelength conversion device 116 is disposed nearby the first focal point f1 and on the transmission path P1 of the excitation light beam E1.

The projection apparatus 400 of the embodiment is similar to the projection apparatus 100 of FIG. 1A, while the main difference therebetween lies in that the reflective component 414 of the embodiment further includes a lens L3 and the projection apparatus 400 further includes a light-uniforming device 418 disposed between the lens L3 and the wavelength conversion device 116. The lens L3 makes the excitation light beam E1 pass through the reflective component 414 and then is transmitted to the light-uniforming device 418.

In the embodiment, the light-uniforming device 418 is a light integration rod 418' and an outlet of the light-uniforming device 418 is disposed on the first focal point f1, in which the shape of the light integration rod 418' is in taper so that the excitation light beam E1 or the converted three color light beams Lr, Lg and Ly emit from the light integration rod 418' with smaller exit light angles. As shown in FIG. 4, the light integration rod 418' is disposed over the wavelength conversion device 116. Since the three color light beams Lr, Lg and Ly respectively have a Lambertian radiation pattern, the light-emitting angles of the three color light beams Lr, Lg and Ly are relatively larger. The light integration rod 418' is to reduce the light-emitting angles of the excited three color light beams Lr, Lg and Ly, so that the three color light beams Lr, Lg and Ly after the first focal point f1 can be effectively reflected by a reflective surface 414a of the reflective component 414 and then are converged at the second focal point f2.

On the other hand, the excitation light beam E1 exited from the light integration rod 418' passes through the first focal point f1 and is reflected by the reflective surface 414a and then converged at the second focal point f2. In this way, all the excitation light beam E1 and the three color light beams Lr, Lg and Ly after passing through the second focal point f2 are transmitted into the light-uniforming device 418 and then emit from the light-uniforming device 418 and are transmitted to the light valve 120. Finally, the light valve 120 converts the light beams into the colorful image frames. In addition, in the embodiment, the shape of the light integration rod 418' is in taper, so that the three color light beams Lr, Lg and Ly emit from the light integration rod 418' with smaller exit light angles. The width of the light integration rod 418 is gradually wider along with a direction from the second focal point f2 to the light valve 120 However, in other embodiments, the light integration rod 418' can be in other shapes, or even no light-uniforming device 418 is adopted, which the invention is not limited to.

In the embodiment, the reflective surface 414a consists of, similarly to the mentioned above, a portion of an ellipse surface or two curve surfaces with different curvatures, i.e., the curve surfaces respectively correspond to the first focal point f1 and the second focal point f2 can be incompletely symmetric with each other. In other words, as long as the shape of the reflective surface can make the light beams converged from the first focal point f1 to the second focal point f2, it falls in the claim scope of the invention.

The Fifth Embodiment

Figure 5:
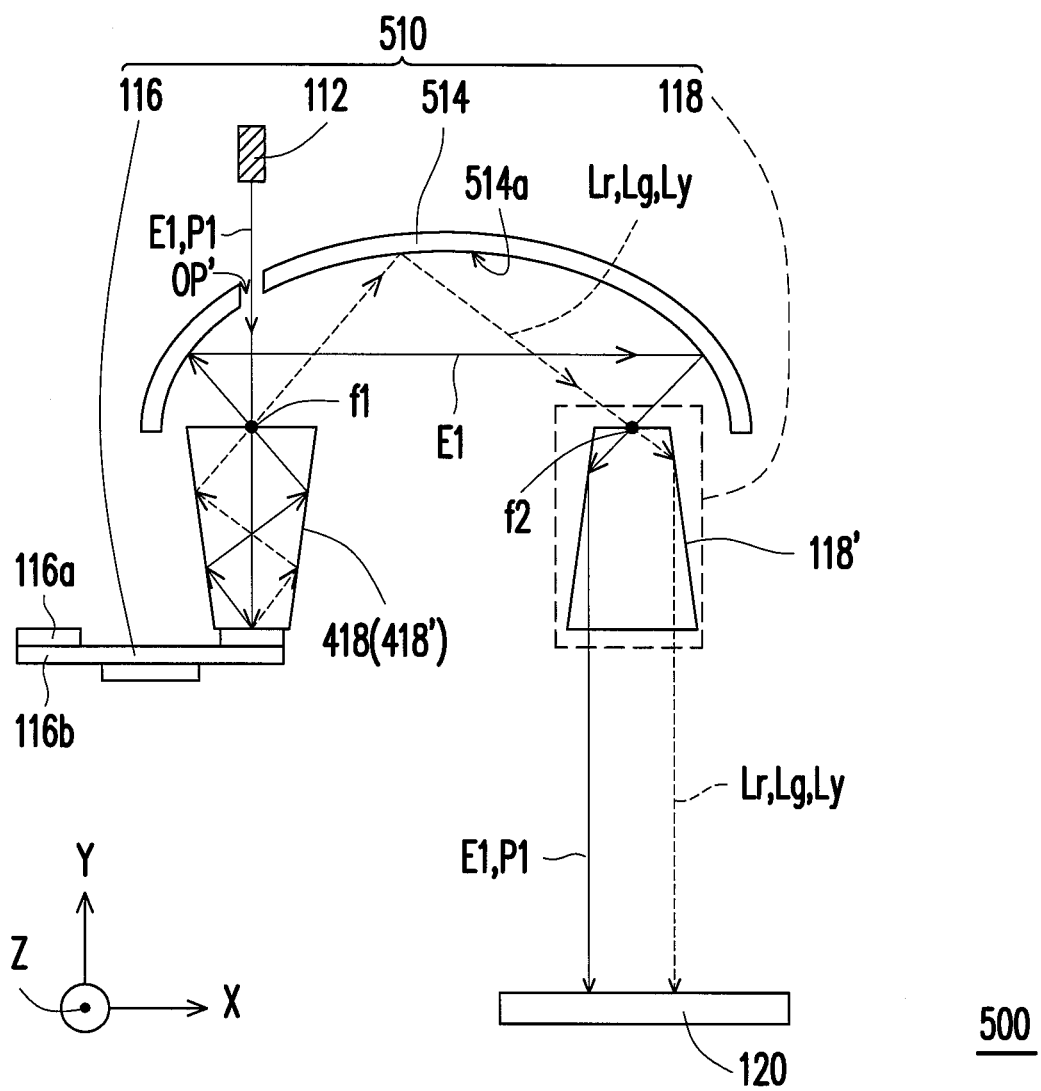
FIG. 5 is a schematic view of a projection apparatus according to a fifth embodiment of the invention.

Referring to FIG. 5, the projection apparatus 500 of the embodiment includes a light source module 510 and the light valve 120. The light source module 510 includes the light-emitting device 112, a reflective component 514, the wavelength conversion device 116 and the optical component 118. The projection apparatus 500 of the embodiment is similar to the projection apparatus 400 of FIG. 4, while the main difference therebetween lie in that the reflective component 514 of the embodiment further includes an opening OP' to allow the excitation light beam E1 passing through the reflective component 514 via the opening OP' and is transmitted to the light-uniforming device 418, in which the light-uniforming device 418 is disposed between the opening OP' and the wavelength conversion device 116.

In summary, the embodiments of the invention have at least one of following advantages or effects. In the embodiments of the invention, by respectively disposing the wavelength conversion device and the optical component nearby the two focal points of the reflective component, the excited color light beams nearby one of the two focal points are converged at another focal point and directly transmitted to the optical component located nearby the other focal point, which can increase the light-converging efficiency of the color light beams and further provide a light source with high luminance. In addition, since the embodiments adopt only one reflective component to achieve a good light-converging efficiency, and therefore, the production cost of the light source module or the projection apparatus can be reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. In addition, the first lens, the second lens, . . . , mentioned in the specification are used to represent the terminologies of the components/devices, and not used to limit the upper or lower bound of the number of the components/devices.

What is claimed is:

1. A light source module, comprising:
a light-emitting device emitting an excitation light beam;
a reflective component comprising a reflective surface, wherein the reflective surface has a first focal point and a second focal point;
a wavelength conversion device comprising a plurality of excited regions and disposed nearby the first focal point and on the transmission path of the excitation light beam, wherein the excitation light beam irradiates the different excited regions at different time by rotating the wavelength conversion device, so that the excitation light beam is converted into different wavelength light beams at different time, and the different wavelength light beams respectively correspond to the different excited regions and are reflected by the reflective surface and are converged at the second focal point; and
an optical component disposed nearby the second focal point and on the transmission paths of the different wavelength light beams so that the different wavelength light beams pass through the second focal point and are transmitted to the optical component.

2. The light source module as claimed in claim 1, wherein the optical component is a light-uniforming device.

3. The light source module as claimed in claim 1, wherein the reflective component further comprises a dichroic portion located between the light-emitting device and the wavelength conversion device, the excitation light beam passes the dichroic portion and is transmitted to the wavelength conversion device and the dichroic portion reflects the different wavelength light beams.

4. The light source module as claimed in claim 1, wherein the reflective component further comprises an opening located between the light-emitting device and the wavelength conversion device so that the excitation light beam passes through the opening to be transmitted to the wavelength conversion device.

5. The light source module as claimed in claim 1, wherein the wavelength conversion device further comprises a transparent region so that the excitation light beam passes through the transparent region to be transmitted to the optical component.

6. The light source module as claimed in claim 5, wherein the optical component is a dichroic unit disposed between the light-emitting device and the reflective component, the dichroic unit reflecting the excitation light beam and allowing the different wavelength light beams passing.

7. The light source module as claimed in claim 6 further comprising an optical path deflection device disposed between the wavelength conversion device and the dichroic unit so that the excitation light beam passing through the transparent region is reflected to the dichroic unit.

8. The light source module as claimed in claim 6 further comprising a light integration rod disposed on the transmission paths of the different wavelength light beams and the excitation light beam.

9. The light source module as claimed in claim 6 further comprising at least one first lens disposed between the second focal point and the dichroic unit.

10. The light source module as claimed in claim 8 further comprising at least one second lens disposed between the dichroic unit and the light integration rod and on the transmission paths of the different wavelength light beams and the excitation light beam.

11. The light source module as claimed in claim 1, wherein the reflective component further comprises a third lens or an opening so that the excitation light beam passes through the reflective component to be transmitted to the optical component.

12. The light source module as claimed in claim 11 further comprising a light-uniforming device disposed between the third lens or the opening and the wavelength conversion device.

13. A projection apparatus, comprising:
a light source module comprising:
- a light-emitting device emitting an excitation light beam;
- a reflective component comprising a reflective surface, wherein the reflective surface has a first focal point and a second focal point;
- a wavelength conversion device comprising a plurality of excited regions and disposed nearby the first focal point and on the transmission path of the excitation light beam, wherein the excitation light beam irradiates the different excited regions at different time by rotating the wavelength conversion device, so that the excitation light beam is converted into different wavelength light beams at different time, and the different wavelength light beams respectively correspond to the different excited regions and are reflected by the reflective surface and converged at the second focal point; and
an optical component disposed nearby the second focal point and on the transmission paths of the different wavelength light beams so that the different wavelength light beams pass through the second focal point and are transmitted to the optical component; and
a light valve disposed on the transmission paths of the excitation light beam and the different wavelength light beams.

14. The projection apparatus as claimed in claim 13, wherein the optical component is a light-uniforming device.

15. The projection apparatus as claimed in claim 13, wherein the reflective component further comprises a dichroic portion located between the light-emitting device and the wavelength conversion device, the excitation light beam passes through the dichroic portion and is transmitted to the wavelength conversion device, and the dichroic portion reflects the different wavelength light beams.

16. The projection apparatus as claimed in claim 13, wherein the reflective component further comprises an opening, and the opening is located between the light-emitting device and the wavelength conversion device so that the excitation light beam passes through the opening to be transmitted to the wavelength conversion device.

17. The projection apparatus as claimed in claim 13, wherein the wavelength conversion device further comprises a transparent region so that the excitation light beam passes through the transparent region to be transmitted to the optical component.

18. The projection apparatus as claimed in claim 17, wherein the optical component is a dichroic unit disposed between the light-emitting device and the reflective component, and the dichroic unit reflects the excitation light beam and allows the different wavelength light beams passing.

19. The projection apparatus as claimed in claim 18 further comprising an optical path deflection device disposed between the wavelength conversion device and the dichroic unit so that the excitation light beam passing through the transparent region is reflected to the dichroic unit.

20. The projection apparatus as claimed in claim 18 further comprising a light integration rod disposed on the transmission paths of the different wavelength light beams and the excitation light beam.

21. The projection apparatus as claimed in claim 18 further comprising at least one first lens disposed between the second focal point and the dichroic unit.

22. The projection apparatus as claimed in claim 18 further comprising at least one second lens disposed between the dichroic unit and the light integration rod and on the transmission paths of the different wavelength light beams and the excitation light beam.

23. The projection apparatus as claimed in claim 13, wherein the reflective component further comprises a third lens or an opening so that the excitation light beam passes through the reflective component to be transmitted to the optical component.

24. The projection apparatus as claimed in claim 23 further comprising a light-uniforming device disposed between the third lens or the opening and the wavelength conversion device.

* * * * *